United States Patent
Park et al.

(10) Patent No.: US 11,552,318 B2
(45) Date of Patent: Jan. 10, 2023

(54) METHOD OF MANUFACTURING ELECTRICITY-GENERATING ASSEMBLY

(71) Applicants: HYUNDAI MOTOR COMPANY, Seoul (KR); KIA CORPORATION, Seoul (KR)

(72) Inventors: Young June Park, Gyeonggi-do (KR); Min Jin Kim, Seoul (KR); Yu Seok Kim, Seoul (KR); Han Hyung Lee, Goyang-si (KR); Seung Ah Yu, Yongin-si (KR); Byung Gun Song, Gwangju-si (KR); Kyu Tae Park, Yongin-si (KR); Ki Sub Lee, Yongin-si (KR); Sun Il Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/475,781

(22) Filed: Sep. 15, 2021

(65) Prior Publication Data

US 2022/0173418 A1   Jun. 2, 2022

(30) Foreign Application Priority Data

Nov. 30, 2020   (KR) .................. 10-2020-0163870

(51) Int. Cl.
*H01M 8/10* (2016.01)
*H01M 8/1004* (2016.01)
*H01M 4/88* (2006.01)

(52) U.S. Cl.
CPC ......... *H01M 8/1004* (2013.01); *H01M 4/881* (2013.01); *H01M 4/8807* (2013.01)

(58) Field of Classification Search
CPC ............ H01M 8/1004; H01M 8/1007; H01M 8/1006; H01M 8/1069; H01M 4/8807;
(Continued)

(56) References Cited

U.S. PATENT DOCUMENTS

| | | | | |
|---|---|---|---|---|
| 2010/0038020 A1* | 2/2010 | Hori | ...................... | H01M 4/881 156/196 |
| 2010/0216048 A1* | 8/2010 | Braeuninger | ....... | H01M 8/0276 429/483 |
| 2011/0311898 A1* | 12/2011 | Yamauchi | ........... | H01M 8/0284 429/480 |

FOREIGN PATENT DOCUMENTS

| | | |
|---|---|---|
| JP | 2005-276789 A | 10/2005 |
| JP | 2006-344522 A | 12/2006 |

(Continued)

*Primary Examiner* — Raymond Alejandro
(74) *Attorney, Agent, or Firm* — Morgan, Lewis & Bockius LLP (57) ABSTRACT

A method of manufacturing an Electricity-Generating Assembly (EGA) includes: preparing an electrolyte membrane including a central portion and a peripheral portion; providing a contact member to the peripheral portion of the electrolyte membrane; providing at least one of a first Gas Diffusion Electrode (GDE) including a reaction portion of a first Gas Diffusion Layer (GDL) and a first electrode layer or a second GDE including a reaction portion of a second GDL and a second electrode layer, on at least one central portion of the first surface of the electrolyte membrane or the second surface of the electrolyte membrane; and providing a gas diffusion portion of a respective GDL among the first and second GDLs on the contact member.

19 Claims, 6 Drawing Sheets

(58) Field of Classification Search
CPC ...... H01M 4/881; H01M 4/8803; H01M 4/99; H01M 4/8825
See application file for complete search history.

(56) References Cited

FOREIGN PATENT DOCUMENTS

| | | |
|---|---|---|
| JP | 2008-226791 A | 9/2008 |
| JP | 2010-257597 A | 11/2010 |
| KR | 6144651 B2 | 6/2017 |
| KR | 10-1755506 B | 7/2017 |
| KR | 10-2019-0072808 A | 6/2019 |

* cited by examiner

METHOD OF MANUFACTURING ELECTRICITY-GENERATING ASSEMBLY

CROSS REFERENCE TO RELATED APPLICATION

The present application claims the benefit of priority to Korean Patent Application No. 10-2020-0163870, filed on Nov. 30, 2020 in the Korean Intellectual Property Office, the entire content of which is incorporated herein for all purposes by this reference.

TECHNICAL FIELD

The present disclosure relates to a method of manufacturing an Electricity-Generating Assembly (EGA) in which a Gas Diffusion Layer (GDL) is not damaged and a warpage phenomenon does not occur even in a structure having a stepped portion.

BACKGROUND

Currently, a polymer electrolyte membrane fuel cell (PEMFC) is most commonly used as a fuel cell for automobiles. In order for this polymer electrolyte membrane fuel cell to normally exhibit high output performance of at least tens of kW under various driving conditions of automobiles, the polymer electrolyte membrane fuel cell must be capable of being stably operated in a wide current density range.

The fuel cell is used in the form of a stack in which unit cells are layered and assembled so as to meet the required power level. The unit cell includes bipolar plates or separators that include a Gas Diffusion Layer (GDL) and a gasket layered on the outer side of a Membrane-Electrode Assembly (MEA), that is, on the outer side where a cathode and an anode are located, and a flow path (flow field) which is provided on the outer side of the gas diffusion layer and through which a reaction gas (hydrogen as fuel and oxygen or air as an oxidant) is supplied and a cooling water passes. After several hundred of such unit cells are layered, an end plate for supporting the unit cells is bonded to the outermost side.

An electrochemical reaction for the generation of electricity in fuel cells occurs in a membrane-electrode assembly including an electrolyte membrane 100 and electrodes of an anode/cathode. In the electrochemical reaction in the fuel cell, after hydrogen supplied to the anode, which is an oxidation electrode of the fuel cell, is divided into hydrogen ions (proton) and electrons due to a Hydrogen Oxidation Reaction (HOR), the hydrogen ions move to the cathode, which is a reduction electrode, through a membrane, and the electrons move to the cathode through an external circuit, as shown in the following Reaction Equation [1]. The hydrogen ions and the electrons are reacted with oxygen gas supplied from the outside at the cathode to generate electricity and heat and also generate water as a reaction by-product due to an oxygen reduction reaction (ORR), as shown in Reaction Equation [2].

$$H_2 \rightarrow 2H^+ + 2e^-, \ E°=0.000 \text{ V (vs. SHE)} \quad [1]$$

$$\tfrac{1}{2}O_2 + 2H^+ + 2e^- \rightarrow H2O, \ E°=1.229 \text{ V (vs. SHE)} \quad [2]$$

Herein, Eo is a standard electrode potential and SHE is a standard hydrogen electrode.

The electrode applied on a gas diffusion layer (GDL) is called a Gas Diffusion Electrode (GDE). When an Electricity-Generating Assembly (EGA) is manufactured in the form of the electrode evenly applied on the GDL, it is critical to make the amount of electrode in contact with the electrolyte membrane similar to the amount of electrode applied thereon.

A conventional method of manufacturing a GDE is focused on conventional coating systems (such as a slot die coater, a doctor blade coater, a spray process, a screen printing process, a doctor blade process, a gravure process, and a slot-die coater) or novel methods (such as coating using electrical conductivity and coating using electrostatic force). That is, when the EGA is manufactured using the GDE, conventionally, the manufacture is limited only to the case where both an electrolyte membrane and an electrode are flat and there is no separate protruding structure in order to make the surface bonding easier.

Accordingly, when the EGA including a structure having a stepped portion is manufactured in the state in which it is not easy to perform the surface bonding, in the case of the application of the GDE methods, there are problems in that the GDL in the GDE is damaged or a warpage phenomenon occurs due to the stepped portion.

The information included in this Background section is only for enhancement of understanding of the general background of the present disclosure and may not be taken as an acknowledgement or any form of suggestion that this information forms the prior art already known to a person skilled in the art.

SUMMARY OF THE DISCLOSURE

The present disclosure has been made keeping in mind the problems encountered in the related art, and specific objectives thereof are as follows.

An objective of the present disclosure is to provide a method of manufacturing an Electricity-Generating Assembly (EGA), which includes providing a Gas Diffusion Electrode (GDE) between contact members forming a stepped portion and then providing a gas diffusion portion of a Gas Diffusion Layer (GDL) so that the gas diffusion portion comes into contact with a reaction portion of the GDL in the GDE. In the method, the GDL is not damaged and a warpage phenomenon does not occur even in a structure having a stepped portion.

The objectives of the present disclosure are not limited to the foregoing, and will be able to be clearly understood through the following description and to be realized by the means described in the claims and combinations thereof.

According to an aspect of the present disclosure, a method of manufacturing an Electricity-Generating Assembly (EGA), which includes an electrolyte membrane, a first electrode on a first surface of the electrolyte membrane, a first Gas Diffusion Layer (GDL) on the first electrode, a second electrode on a second surface of the electrolyte membrane, and a second GDL on the second electrode, includes preparing the electrolyte membrane including a central portion and a peripheral portion laterally extending from the central portion, providing a contact member to the peripheral portion of the electrolyte membrane, providing at least one gas diffusion electrode of a first Gas Diffusion Electrode (GDE), including a reaction portion of the first gas diffusion layer and a first electrode layer, and a second GDE, including a reaction portion of the second GDL and a second electrode layer, on at least one central portion of a central portion of the first surface of the electrolyte membrane and a central portion of the second surface thereof so that the gas diffusion electrode comes into contact with a lateral surface of the contact member, and providing a gas diffusion portion of the GDL on the contact member so that the gas diffusion portion comes into contact with a lateral surface of the reaction portion of the GDL.

The method of manufacturing the EGA may include preparing the electrolyte membrane including the central portion and the peripheral portion laterally extending from the central portion, providing the first electrode to the central portion of the first surface of the electrolyte membrane, providing the contact member to the peripheral portion of the electrolyte membrane, providing the second GDE, including the second electrode and the reaction portion of the second gas diffusion layer, on the central portion of the second surface of the electrolyte membrane, providing the gas diffusion portion of the second gas diffusion layer on the contact member so that the gas diffusion portion comes into contact with the lateral surface of the reaction portion of the second gas diffusion layer, and providing the first gas diffusion layer on the first electrode.

The contact member may be provided to the peripheral portion of the second surface of the electrolyte membrane, or may be provided to both the peripheral portion of the second surface of the electrolyte membrane and the peripheral portion of the first surface of the electrolyte membrane in contact with a lateral surface of the first electrode.

The contact member may include one or more selected from the group consisting of a sub-gasket and an adhesive sheet.

The second gas diffusion electrode may be provided while pressing is performed with 0.5 to 5 MPa.

The gas diffusion portion of the second gas diffusion layer may be provided while pressing is performed with 0.5 to 5 MPa.

The gas diffusion portion of the second gas diffusion layer may be provided so that the gas diffusion portion has a thickness equal to a thickness of a reaction portion of the second gas diffusion layer after the pressing.

The reaction portion of the second gas diffusion layer may have less roughness or fewer pores than the gas diffusion portion of the second gas diffusion layer.

The first gas diffusion layer may have a thickness smaller than or equal to a thickness of the second gas diffusion layer.

The first gas diffusion layer may include pores fewer than or equal to pores in the second gas diffusion layer.

The method of manufacturing the EGA may include preparing the electrolyte membrane including the central portion and the peripheral portion laterally extending from the central portion, providing the contact member to the peripheral portion of the electrolyte membrane, providing the first GDE, including the reaction portion of the first gas diffusion layer and the first electrode layer, on the central portion of the first surface of the electrolyte membrane so that the first gas diffusion electrode comes into contact with the lateral surface of the contact member, and providing the second GDE, including the reaction portion of the second gas diffusion layer and the second electrode layer, on the central portion of the second surface of the electrolyte membrane so that the second gas diffusion electrode comes into contact with the lateral surface of the contact member, and providing the gas diffusion portion of the first gas diffusion layer on the contact member so that the gas diffusion portion comes into contact with the lateral surface of the reaction portion of the first gas diffusion layer, and providing the gas diffusion portion of the second gas diffusion layer on the contact member so that the gas diffusion portion comes into contact with the lateral surface of the reaction portion of the second gas diffusion layer.

The contact member may be provided to both the peripheral portion of the first surface of the electrolyte membrane and the peripheral portion of the second surface of the electrolyte membrane.

The contact member may include one or more selected from the group consisting of a sub-gasket and an adhesive sheet.

The first gas diffusion electrode and the second gas diffusion electrode may be provided while pressing is performed with 0.5 to 5 MPa.

The gas diffusion portion of the first gas diffusion layer and the gas diffusion portion of the second gas diffusion layer may be provided while pressing is performed with 0.5 to 5.

The gas diffusion portion of the first gas diffusion layer and the gas diffusion portion of the second gas diffusion layer may be provided so that the gas diffusion portion of the first gas diffusion layer has a thickness equal to a thickness of a reaction portion of the first gas diffusion layer after the pressing and so that the gas diffusion portion of the second gas diffusion layer has a thickness equal to a thickness of a reaction portion of the second gas diffusion layer after the pressing.

The reaction portion of the first gas diffusion layer may have less roughness and fewer pores than the gas diffusion portion of the first gas diffusion layer, and the reaction portion of the second gas diffusion layer may have less roughness and fewer pores than the gas diffusion portion of the second gas diffusion layer.

The first gas diffusion layer may have a thickness smaller than or equal to a thickness of the second gas diffusion layer.

The first gas diffusion layer may include pores fewer than or equal to pores in the second gas diffusion layer.

A method of manufacturing an Electricity-Generating Assembly (EGA) according to another embodiment of the present disclosure has merits in that, even in the case of contact members having a stepped portion structure, that is, in the form of separate sub-gaskets or adhesive sheets, a Gas Diffusion Electrode (GDE) process is applicable thereto and the limitation of using the GDE process only on one surface is overcome. Accordingly, even when the GDE process is applied, it is possible to improve the performance of the EGA manufactured by minimizing the limit of the bonding pressure so as to reduce the contact resistance between an electrolyte membrane and an electrode, and it is also possible to improve the durability of the EGA by minimizing the exposed portion of the electrolyte membrane. Therefore, the method of manufacturing the EGA according to the present disclosure has merits in that a Gas Diffusion Layer (GDL) is not damaged and a warpage phenomenon does not occur even in a structure having a stepped portion, and that the contact area of the interface having no empty space between the electrode of the GDE and the electrolyte membrane is increased, which makes the surface pressure of the GDL in the GDE uniform and enables gas to flow into each cell at a uniform flow rate.

The effects of the present disclosure are not limited to the foregoing, and should be understood to include all effects that can be reasonably anticipated from the following description.

DESCRIPTION OF THE DETAILED EMBODIMENTS

The above and other objectives, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. In addition, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. For example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Conventionally, a Gas Diffusion Layer (GDL) including a reaction portion and a diffusion portion in one layer is used. However, there are problems in that when an Electricity-Generating Assembly (EGA) is manufactured with the GDL, the diffusion portion is damaged and a warpage phenomenon occurs in a structure having a stepped portion.

Figure 1:
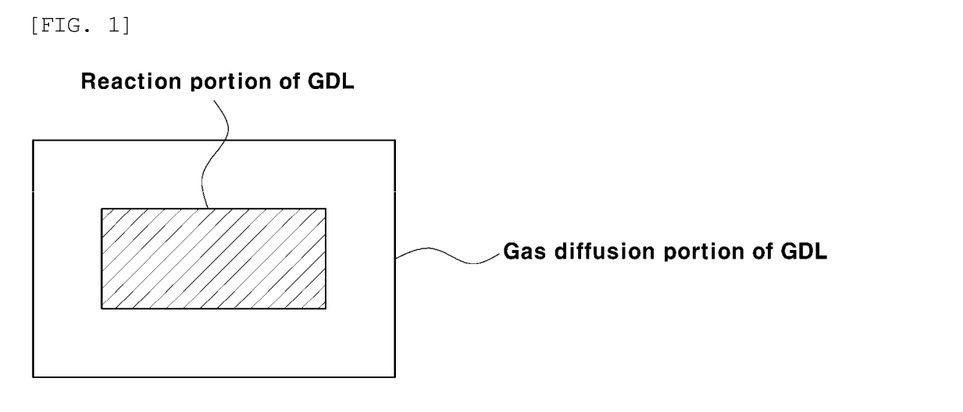
FIG. 1 is a cross-sectional view of a Gas Diffusion Layer (GDL) used in a process of manufacturing an Electricity-Generating Assembly (EGA) according to the present disclosure.

FIG. 1 shows a cross-sectional view of a Gas Diffusion Layer (GDL) used in a process of manufacturing an Electricity-Generating Assembly (EGA) according to the present disclosure.

Referring to FIG. 1, the present disclosure describes a method of manufacturing the electricity-generating assembly (EGA), in which the reaction portion of the GDL is located at the center portion, gas diffusion portions of the GDL are separately located so as to surround the reaction portion of the GDL, and the reaction portion of the GDL and the gas diffusion portion of the GDL are differently pressed, so that the gas diffusion layer (GDL) is not damaged and a warpage phenomenon does not occur even in a structure having the stepped portion, thereby accomplishing the present disclosure.

In a method of manufacturing an Electricity-Generating Assembly (EGA) 10 according to an embodiment of the present disclosure, the electricity-generating assembly includes an electrolyte membrane, a first electrode provided on a first surface of the electrolyte membrane, a first gas diffusion layer (GDL) provided on the first electrode, a second electrode provided on a second surface of the electrolyte membrane, and a second gas diffusion layer (GDL) provided on the second electrode. The method includes preparing the electrolyte membrane including a central portion and a peripheral portion laterally extending from the central portion, providing a contact member to the peripheral portion of the electrolyte membrane, providing at least one gas diffusion electrode of a first gas diffusion electrode (GDE), including a reaction portion of the first GDL and a first electrode layer, and a second gas diffusion electrode (GDE), including a reaction portion of the second GDL and a second electrode layer, on at least one central portion of a central portion of a first surface of the electrolyte membrane and a central portion of a second surface thereof so that the gas diffusion electrode comes into contact with a lateral surface of the contact member, and providing a gas diffusion portion of the GDL on the contact member so that the gas diffusion portion comes into contact with the lateral surface of the reaction portion of the GDL.

Figure 2:
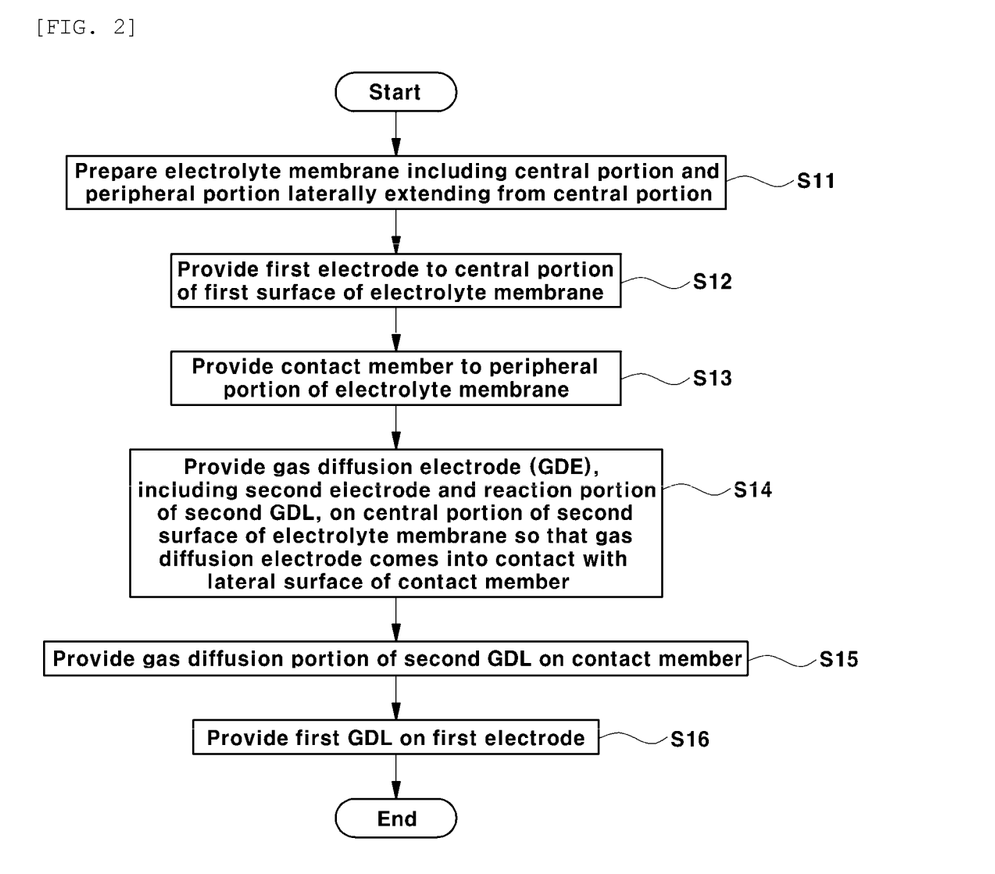
FIG. 2 is a flowchart showing a process of manufacturing an EGA according to an embodiment of the present disclosure.
Figure 3:
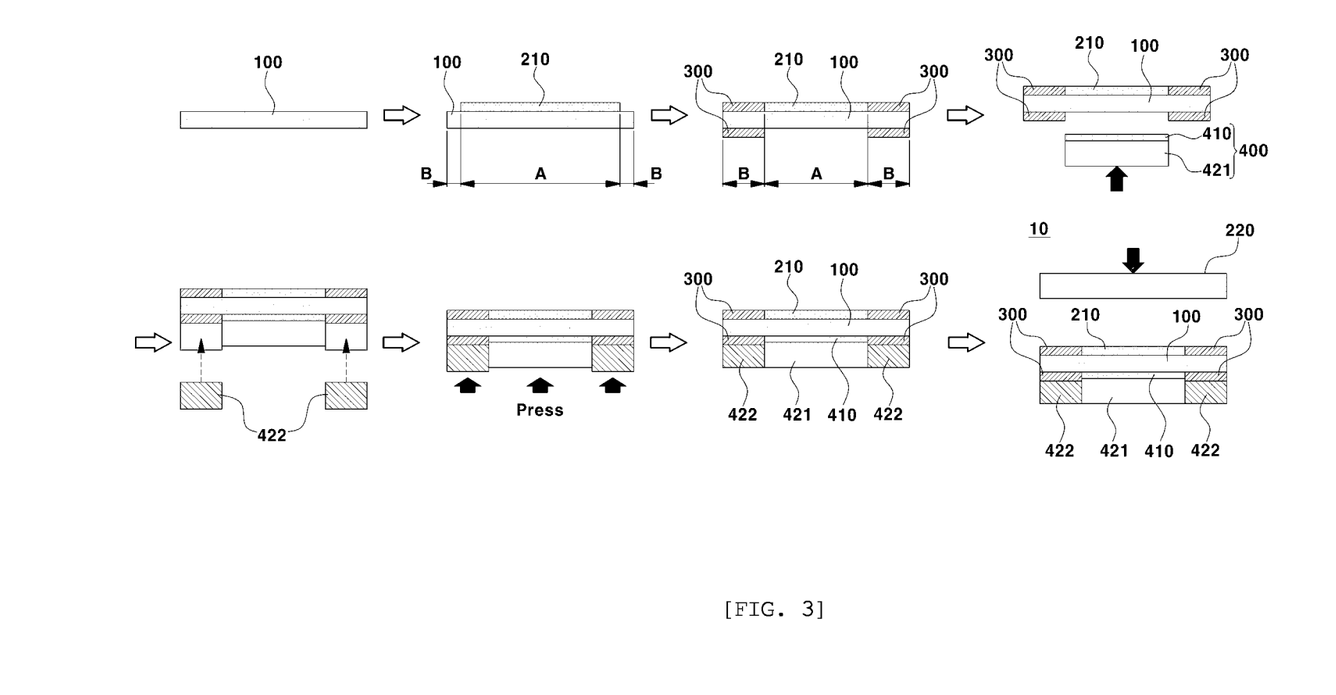
FIG. 3 is a cross-sectional view showing each step of the process of manufacturing the EGA according to the flowchart of FIG. 3.

FIG. 2 is a flowchart showing the process of manufacturing the EGA according to an embodiment of the present disclosure. FIG. 3 is a cross-sectional view showing each step of the process of manufacturing the EGA according to the flowchart of FIG. 2. Referring to this, in the method of manufacturing the EGA according to an embodiment of the present disclosure, the electricity-generating assembly includes an electrolyte membrane 100, a first electrode 210 provided on a first surface of the electrolyte membrane 100, a first gas diffusion layer (GDL) 220 provided on the first electrode 210, a second electrode 410 provided on a second surface of the electrolyte membrane 100, and a second gas diffusion layer (GDL) 420 provided on the second electrode 410. The method includes preparing the electrolyte membrane 100 including a central portion A and a peripheral portion B laterally extending from the central portion A at step S11, providing the first electrode 210 to the central portion A of the first surface of the electrolyte membrane 100 at step S12, providing the contact member 300 to the peripheral portion B of the electrolyte membrane 100 at step S13, providing a second gas diffusion electrode (GDE) 400, including the second electrode 410 and a reaction portion 421 of the second GDL, on the central portion A of the second surface of the electrolyte membrane 100 so that the second gas diffusion electrode comes into contact with the lateral surface of the contact member 300 at step S14, providing a gas diffusion portion 422 of the second GDL on the contact member 300 at step S15, and providing the first GDL 220 on the first electrode 210 at step S16.

Each step will be described in detail with reference to FIGS. 2 and 3.

The step of preparing the electrolyte membrane 100 at step S11 is a step of preparing the electrolyte membrane 100 including the central portion A and the peripheral portion B laterally extending from the central portion A. The central portion A of the electrolyte membrane 100 may be a region where the first electrode 210 and the gas diffusion electrode (GDE) are provided, and the peripheral portion B may be a region where the contact member 300 is provided.

The electrolyte membrane 100 according to an embodiment of the present disclosure is not particularly limited as long as the electrolyte membrane serves as a transmission path through which hydrogen ions generated in the first electrode 210 are transmitted to the second electrode 410. The electrolyte membrane 100 may be a porous film in which ionomers are impregnated. A reinforcing layer may include a typical porous film that is usable in the present disclosure, for example, one or more selected from the group consisting of polytetrafluoroethylene (PTFE), poly(ethylene terephthalate) (PET), polybenzoxazole (PBC)), polyethylene (PE), polypropylene (PP), and polyimide (PI), and is not limited to including only a specific type. Preferably, the reinforcing layer may be PTFE having high mechanical strength to improve the durability of a fuel cell.

The step of providing the first electrode 210 at step S12 is a step of providing the first electrode 210 to the central portion A of the first surface of the electrolyte membrane 100. The provided first electrode 210 may include an electrolyte solution and a metal-catalyst-carrying carbon support composite including a carbon support carrying a metal catalyst. The electrolyte in the electrolyte solution may be a fluoro-based polymer including a perfluorocarbon polymer in which a sulfonic acid-based compound, water, and alcohol are dissolved, and the metal catalyst may be a platinum catalyst.

Figure 4:
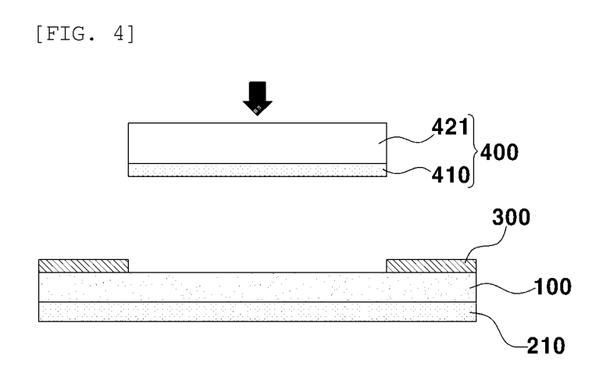
FIG. 4 is a cross-sectional view showing a contact member provided to a peripheral portion of a second surface of an electrolyte membrane according to an embodiment of the present disclosure.

The step of providing the contact member 300 at step S13 is a step of providing the contact member 300 to the peripheral portion B of the electrolyte membrane 100. As shown in FIG. 3, the contact member 300 may be provided to both the peripheral portion B of the second surface of the electrolyte membrane 100 and the peripheral portion B of the first surface of the electrolyte membrane 100 in contact with the lateral surface of the first electrode 210. Further, as shown in FIG. 4, the contact member 300 may be provided to the peripheral portion B of the second surface of the electrolyte membrane 100. That is, the contact member 300 may be provided to the peripheral portion B of the electrolyte membrane 100, so that a stepped portion may be formed wholly around the peripheral portion B of the second surface of the electrolyte membrane 100.

The contact member 300 according to an embodiment of the present disclosure may include one or more selected from the group consisting of a sub-gasket and an adhesive sheet.

The sub-gasket is not particularly limited as long as the sub-gasket increases the mechanical strength and stiffness of the electrolyte membrane 100 to be provided and also is exposed together with the first electrode 210 and the second electrode 410 to the first and second surfaces of the electrolyte membrane 100 so that the electrodes come into contact with a reaction gas. The sub-gasket may be provided to both the peripheral portion B of the second surface of the electrolyte membrane 100 and the peripheral portion B of the first surface of the electrolyte membrane 100 in contact with the lateral surface of the first electrode 210. The sub-gasket may include a typical material that is usable in the present disclosure, for example, an inert and dimensionally stable material. Specifically, the sub-gasket may include one or more selected from the group consisting of PET (polyethylene terephthalate), PCT (poly-cyclohexylene dimethylene-terephthalate), PEN (polyethylene naphthalate), and Kapton® (polyimide), and is not limited to including specific types. Preferably, the sub-gasket may include PEN having excellent heat resistance, mechanical strength, and stiffness.

The adhesive sheet may serve to properly bond the GDL and the MEA or the cell frame and the MEA without an empty space, thus maintaining mechanical strength and ensuring airtightness. The adhesive sheet may be provided to the peripheral portion B of the second surface of the electrolyte membrane 100. The adhesive sheet may include a typical material that is usable in the present disclosure, for example, one or more selected from the group consisting of an organic material, acryl, silicone, metallic silicone, polyester, polyurethane, EVA (ethylene co-vinyl acetate), and PVAc (polyvinyl acetate), and is not limited to including specific types. The adhesive sheet may include polyurethane having excellent heat resistance and water resistance.

The step of providing the second gas diffusion electrode (GDE) at step S14 is a step of providing the second gas diffusion electrode (GDE) 400, including the second electrode 410 and the reaction portion 421 of the second gas diffusion layer (GDL), on the central portion A of the second surface of the electrolyte membrane 100 so that the second gas diffusion electrode comes into contact with the lateral surface of the contact member 300.

The second GDL 420 is not particularly limited as long as the second GDL is a porous gas diffusion layer that ensures gas diffusivity and electrical conductivity. The second GDL 420 according to an embodiment of the present disclosure may include a typical GDL that is usable in the present disclosure, for example, one or more selected from the group consisting of carbon paper, carbon black, carbon cloth, carbon paper, carbon non-woven fabric, carbon mesh (metal mesh), and foam metal. PTFE (polytetrafluoroethylene) and cerium oxide may be added thereto, and the second GDL is not limited to including specific types. The second GDL may include carbon black having excellent electrical conductivity and processability, PTFE that improves the water repellency of the GDL, and cerium oxide that prevents oxidation of the electrolyte membrane of the MEA (membrane electrode assembly) so as to increase the durability thereof. The second GDL 420 may be manufactured in the form of GDE using one selected from the group consisting of carbon paper, carbon black, carbon cloth, carbon paper, carbon non-woven fabric, carbon mesh (metal mesh), and foam metal, and the shape thereof is not limited to a specific shape. The second electrode 410 and the second GDL 420 may be manufactured in the form of GDE using various processes such as a spray process, a doctor blade process, a gravure process, a slot-die coating process, a screen printing process, and a 3D printing process, and a process of manufacturing the second GDE 400 is not limited to a specific process.

The second GDL 420 according to an embodiment of the present disclosure may include the reaction portion 421 and the gas diffusion portion 422, and the region of the second GDL 420 included in the GDE 400 may preferably be the reaction portion 421 of the second GDL.

The second GDE 400 may be provided on the central portion A of the second surface of the electrolyte membrane 100 so that the second GDE comes into contact with the lateral surface of the contact member 300. The second GDE may be provided while pressing is performed with 0.5 to 5 MPa. When the GDE is pressed with a pressure of less than 0.5 MPa, there is a drawback in that the performance is reduced due to poor interfacial bonding strength. When the GDE is pressed with a pressure of more than 5 MPa, there is a drawback in that the durability is reduced because the number of pores of the GDL is reduced.

When the second GDE 400 according to an embodiment of the present disclosure is provided, the GDE 400 including the reaction portion 421 of the second GDL is provided so as to avoid the contact member 300 forming a stepped portion. Accordingly, the second GDE 400, which has a smaller size compared to a conventional technology, is bonded to the electrolyte membrane 100, thus providing a relatively stronger bonding pressure.

The step of providing the gas diffusion portion 422 of the second GDL at step S15 is a step of providing the gas diffusion portion 422 of the second GDL on the contact member 300 provided on the peripheral portion B of the second surface of the electrolyte membrane 100.

The gas diffusion portion 422 of the second GDL may be provided on the contact member 300, so that the gas diffusion portion is located to be in contact with the lateral surface of the reaction portion 421 of the second GDL in the GDE. Since the second GDE is provided on the central portion A of the second surface of the electrolyte membrane 100 while pressing is performed with 0.5 to 5 MPa, the reaction portion 421 of the second GDL in the second GDE may be thin due to the pressing. Accordingly, the gas diffusion portion 422 of the provided second GDL may be provided so as to have the same thickness as the reaction portion 421 of the second GDL located in contact with the gas diffusion portion. Therefore, referring to FIG. 3, the gas diffusion portion 422 of the second GDL may be provided while pressing is performed with 0.5 to 5 MPa. Further, instead of providing the gas diffusion portion 422 of the second GDL with pressing, the gas diffusion portion may be provided so as to have the same thickness as the reaction portion 421 of the second GDL. Accordingly, the thickness of the reaction portion 421 of the second GDL included in the GDE and the thickness of the gas diffusion portion 422 of the second GDL may be adjusted so as to be the same as each other. The reaction portion 421 and the gas diffusion portion 422 of the second GDL may be individually provided, so there may be a slight difference in thickness therebetween. However, since the second GDL 420 has a relatively high roughness, a slight difference in thickness hardly causes new spaces. Even though the new spaces are formed, the spaces may act as natural cracks of the second GDL 420, thus being used as water discharge paths, so the spaces may not adversely affect the performance or mechanical strength of the EGA. That is, in the method of manufacturing the EGA according to the present disclosure, despite the constitution of the stepped portion formed by the provision of the contact member 300, the gas diffusion portion 422 of the second GDL is provided on the contact member 300 after the second GDE is provided, whereby the limitation that the GDE process cannot be applied to a structure having a stepped portion is overcome. Even when the GDE process is applied, it is possible to reduce the contact resistance between the electrolyte membrane 100 and the electrode by minimizing the limit of the bonding pressure. Further, the gas diffusion layer (GDL) is not damaged, a warpage phenomenon does not occur, and the contact area of the interface having no empty space between the electrode of the GDE and the electrolyte membrane is increased, which makes the surface pressure of the GDL in the GDE uniform and enables gas to flow into each cell at a uniform flow rate.

In the present disclosure, the roughness can be measured for example by scratching the surface using AFM (Atomic Force Microscopy) or nano-indenter equipment, or the surface roughness can be measured using 3D scanner equipment. In the 3D scanner, the surface roughness can be compared through the Ra value (average roughness).

In general, roughness can be compared using the Ra value. When the Ra value is 5 or less, it is generally expressed that roughness is low, and when the Ra value is 10 or more, it is considered that the roughness is high.

The gas diffusion portion 422 of the second GDL may be provided on the contact member 300, so that the gas diffusion portion is located to be in contact with the lateral surface of the reaction portion 421 of the second GDL in the second GDE 400. The gas diffusion portion 422 of the second GDL may be of the same type as or the different type from the reaction portion 421 of the second GDL in the GDE. When the types of the gas diffusion portion 422 of the second GDL and the reaction portion 421 of the second GDL in the second GDE 400 are different from each other, the reaction portion 421 of the second GDL may have less roughness or fewer pores than the gas diffusion portion 422 of the second GDL. That is, since the reaction portion 421 of the second GDL which has less roughness or fewer pores than the gas diffusion portion 422 of the second GDL is used, there is a merit in that the GDE process is easily performed because the reaction portion 421 of the second GDL included in the GDE is easily coated with the second electrode 410.

The step of providing the first GDL at step S16 is a step of providing the first GDL 220 on the first electrode 210. The first GDL 220 provided on the first electrode 210 may be the same as or different from the second GDL 420. When the first GDL 220 according to an embodiment of the present disclosure is different from the second GDL 420, the first electrode 210 is an anode, and the second electrode 410 is a cathode, so the gas distribution of hydrogen is higher than that of oxygen. Accordingly, the thickness of the first GDL 220 may be smaller than or equal to the thickness of the second GDL 420, and the number of pores in the first GDL 220 may be smaller than or equal to the number of pores in the second GDL 420. That is, there is a merit in that the thickness and the pores of the first GDL 220 and the second GDL 420 in contact with the first and second electrodes are capable of being properly adjusted depending on the type of reaction gases according to the first electrode 210 and the second electrode 410.

Therefore, in the method of manufacturing the EGA according to an embodiment of the present disclosure, even in the case of contact members 300 having a stepped portion structure, that is, in the form of separate sub-gaskets or adhesive sheets, a gas diffusion electrode (GDE) process is applicable thereto. Accordingly, even when the GDE process is applied, it is possible to improve the performance of the EGA manufactured by minimizing the limit of the bonding pressure so as to reduce the contact resistance between an electrolyte membrane 100 and an electrode, and it is also possible to improve the durability of the EGA by minimizing the exposed portion of the electrolyte membrane 100. Therefore, the method of manufacturing the electricity-generating assembly (EGA) according to the present disclosure has merits in that a gas diffusion layer (GDL) is not damaged and a warpage phenomenon does not occur even in a structure having a stepped portion, and that the contact area of the interface having no empty space between the electrode of the GDE and the electrolyte membrane is increased, which makes the surface pressure of the GDL in the GDE uniform and enables gas to flow into each cell at a uniform flow rate.

Figure 5:
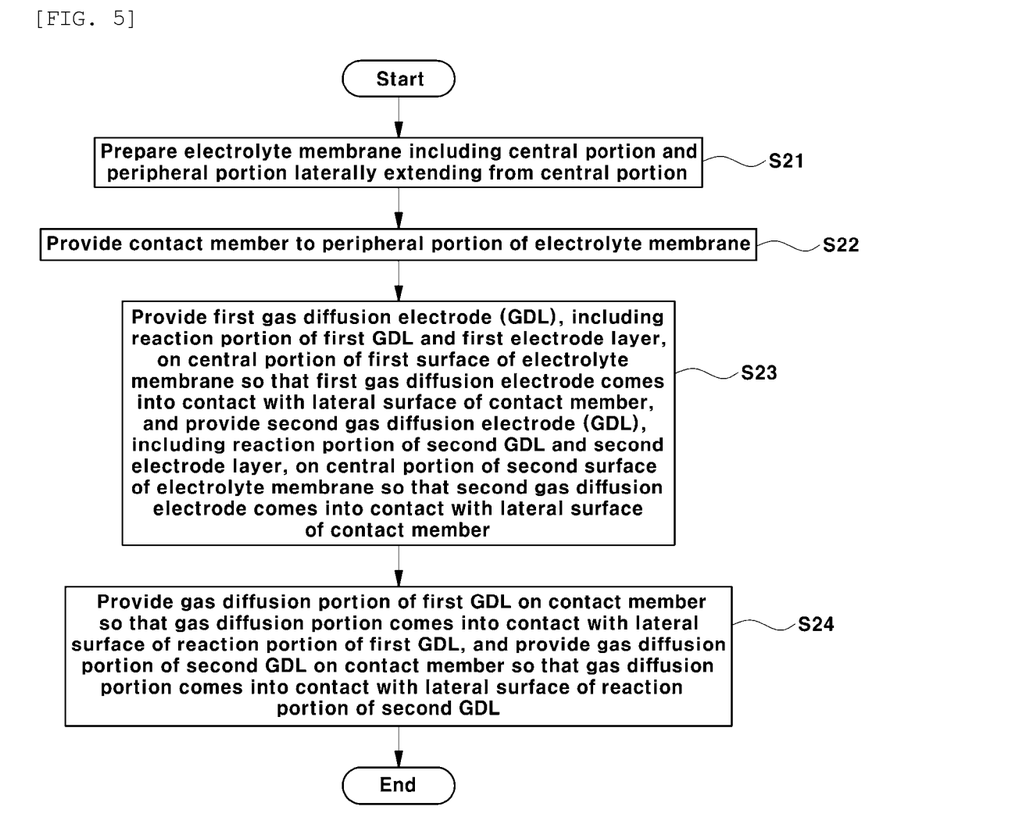
FIG. 5 is a flowchart showing a process of manufacturing an EGA according to another embodiment of the present disclosure.
Figure 6:
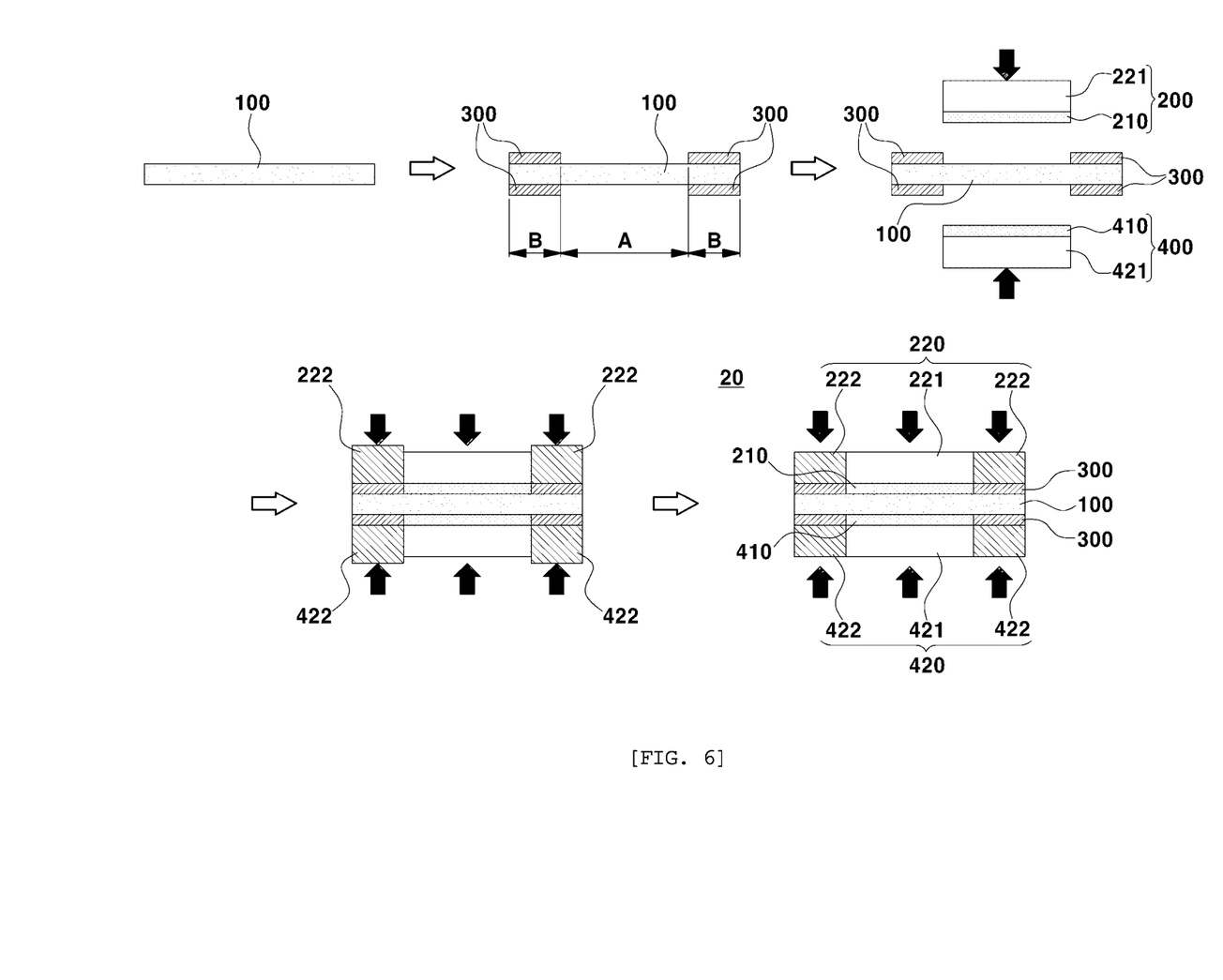
FIG. 6 is a cross-sectional view showing each step of the process of manufacturing the EGA according to the flowchart of FIG. 5.

FIG. 5 is a flowchart showing a process of manufacturing an EGA according to another embodiment of the present disclosure. FIG. 6 is a cross-sectional view showing each step of the process of manufacturing the electricity-generating assembly (EGA) 20 according to the flowchart of FIG. 5. In a method of manufacturing an MEA, the MEA includes an electrolyte membrane 100, a first electrode 210 provided on a first surface of the electrolyte membrane 100, a first gas diffusion layer (GDL) 220 provided on the first electrode 210, a second electrode 410 provided on a second surface of the electrolyte membrane 100, and a second gas diffusion layer (GDL) 420 provided on the second electrode 410. The method includes preparing the electrolyte membrane 100 including a central portion A and a peripheral portion B laterally extending from the central portion A at step S21, providing a contact member 300 to the peripheral portion B of the electrolyte membrane 100 at step S22, providing a first gas diffusion electrode (GDE) 200, including a reaction portion 221 of the first GDL and a layer of the first electrode 210, on the central portion A of the first surface of the electrolyte membrane 100 so that the first gas diffusion electrode comes into contact with the lateral surface of the contact member 300, and providing a second gas diffusion electrode (GDE) 400, including a reaction portion 421 of the second GDL and a layer of the second electrode 410, on the central portion A of the second surface of the electrolyte membrane 100 so that the second gas diffusion electrode comes into contact with the lateral surface of the contact member 300 at step S23, and providing a gas diffusion portion 222 of the first GDL on the contact member 300 so that the gas diffusion portion comes into contact with the lateral surface of the reaction portion 221 of the first GDL, and providing a gas diffusion portion 422 of the second GDL on the contact member 300 so that the gas diffusion portion comes into contact with the lateral surface of the reaction portion 421 of the second GDL at step S24.

Each step will be described in detail with reference to FIGS. 5 and 6.

The step of preparing the electrolyte membrane 100 at step S21 is a step of preparing the electrolyte membrane 100 including the central portion A and the peripheral portion B laterally extending from the central portion A. The central portion A of the electrolyte membrane 100 may be a region where the first gas diffusion electrode (GDE) 200 and the second gas diffusion electrode (GDE) 400 are provided, and the peripheral portion B may be a region where the contact member 300 is provided. The electrolyte membrane 100 according to another embodiment of the present disclosure is not particularly limited as long as the electrolyte membrane serves as a transmission path through which hydrogen ions generated in the first electrode 210 are transmitted to the second electrode 410. The electrolyte membrane 100 may be the same as or different from the electrolyte membrane 100 in the 'step of preparing the electrolyte membrane 100 at step S11'.

The step of providing the contact member 300 at step S22 is a step of providing the contact member 300 to the peripheral portion B of the electrolyte membrane 100. As shown in FIG. 5, the contact member 300 may be provided to both the peripheral portion B of the first surface of the electrolyte membrane 100 and the peripheral portion B of the second surface of the electrolyte membrane 100. That is, the contact member 300 may be provided to the peripheral portion B of the electrolyte membrane 100, so that a stepped portion may be formed around both of the peripheral portions B of the first and second surfaces of the electrolyte membrane 100.

The contact member 300 according to another embodiment of the present disclosure may include one or more selected from the group consisting of a sub-gasket and an adhesive sheet. The sub-gasket is not particularly limited as long as the sub-gasket increases the mechanical strength and stiffness of the electrolyte membrane 100 to be provided and also is exposed together with the first electrode 210 and the second electrode 410 to the first surface and the second surface of the electrolyte membrane 100 so that the electrodes come into contact with a reaction gas. The sub-gasket may be the same as or different from the sub-gasket in the 'step of providing the contact member 300 at step S13'. Further, the adhesive sheet may serve to properly bond the GDL and the MEA or the cell frame and the MEA without an empty space, thus maintaining mechanical strength and ensuring airtightness. The adhesive sheet may be the same as or different from the adhesive sheet in the 'step of providing the contact member 300 at step S13'.

The step of providing the first gas diffusion electrode (GDE) and the second gas diffusion electrode (GDE) at step S23 is a step of providing the first GDE 200, including the reaction portion 221 of the first GDL and the layer of the first electrode 210, on the central portion A of the first surface of the electrolyte membrane 100 so that the first GDE comes into contact with the lateral surface of the contact member 300, and providing the second GDE 400, including the reaction portion 421 of the second GDL and the layer of the second electrode 410, on the central portion A of the second surface of the electrolyte membrane 100 so that the second GDE comes into contact with the lateral surface of the contact member 300.

Each of the first electrode 210 and the second electrode 410 according to another embodiment of the present disclosure may be a cathode or an anode, but is not limited to specific electrodes. The first electrode 210 may be an anode, and the second electrode 410 may be a cathode.

The first GDL 220 and the second GDL 420 according to another embodiment of the present disclosure are not particularly limited as long as the first and second GDLs are a porous gas diffusion layer that ensures gas diffusivity and electrical conductivity, and may be the same as or different from the second GDL 420 in the 'step of providing the gas diffusion electrode (GDE) at step S14'.

The first GDL 220 and the second GDL 420 according to another embodiment of the present disclosure may include the respective reaction portions 221 and 421 and the respective gas diffusion portions 222 and 422. The region of the first GDL included in the first GDE 200 may be the reaction portion 221 of the first GDL. The region of the second GDL included in the second GDE 400 may be the reaction portion 421 of the second GDL.

According to another embodiment of the present disclosure, the first GDL 220 provided on the first electrode 210 may be the same as or different from the second GDL 420 provided on the second electrode 410. When the first GDL 220 is different from the second GDL 420, the first electrode 210 may be an anode, and the second electrode 410 may be a cathode, so that the gas distribution of hydrogen is higher than that of oxygen. Accordingly, the thickness of the first GDL 220 may be smaller than or equal to the thickness of the second GDL 420, and the number of pores in the first GDL 220 may be smaller than or equal to the number of pores in the second GDL 420. That is, there is a merit in that the thickness and the pores of the first GDL 220 and the second GDL 420 in contact with the first and second electrodes are capable of being properly adjusted depending on the type of reaction gases according to the first electrode 210 and the second electrode 410.

Therefore, in the method of manufacturing the EGA according to an embodiment of the present disclosure, even in the case of contact members 300 having a stepped portion structure, that is, in the form of separate sub-gaskets or adhesive sheets, a gas diffusion electrode (GDE) process is applicable thereto. Therefore, even when the GDE process is applied, it is possible to improve the performance of the EGA manufactured by minimizing the limit of the bonding pressure so as to reduce the contact resistance between an electrolyte membrane 100 and an electrode, and it is also possible to improve the durability of the EGA by minimizing the exposed portion of the electrolyte membrane 100. Therefore, the method of manufacturing the electricity-generating assembly (EGA) according to the present disclosure has merits in that a gas diffusion layer (GDL) is not damaged and a warpage phenomenon does not occur even in a structure having a stepped portion, and that the contact area of the interface having no empty space between the electrode of the GDE and the electrolyte membrane is increased, which makes the surface pressure of the GDL in the GDE uniform and enables gas to flow into each cell at a uniform flow rate.

The first GDE 200 may be provided on the central portion A of the first surface of the electrolyte membrane 100 so that the first GDE comes into contact with the lateral surface of the contact member 300. The second GDE 400 may be provided on the central portion A of the second surface of the electrolyte membrane 100 so that the second GDE comes into contact with the lateral surface of the contact member 300. The first GDE 200 and the second GDE 400 may be provided while pressing is performed with 0.5 to 5 MPa. When the GDE is pressed with a pressure of less than 0.5 MPa, there is a drawback in that the performance is reduced due to poor interfacial bonding strength. When the GDE is pressed with a pressure of more than 5 MPa, there is a drawback in that the durability is reduced because the number of pores of the GDL is reduced.

When the first GDE 200 and the second GDE 400 according to another embodiment of the present disclosure are provided, the first GDE 200 including the reaction portion 221 of the first GDL and the second GDE 400 including the reaction portion 421 of the second GDL are provided so as to avoid the contact member 300 forming a stepped portion. Accordingly, the GDE, which has a smaller size compared to a conventional technology, is bonded to the electrolyte membrane 100, thus providing a relatively stronger bonding pressure.

The step of providing the gas diffusion portion 222 of the first GDL and providing the gas diffusion portion 422 of the second GDL at step S24 is a step of providing the gas diffusion portion 222 of the first GDL on the contact member 300 so that the gas diffusion portion 222 comes into contact with the lateral surface of the reaction portion 221 of the first GDL, and providing the gas diffusion portion 422 of the second GDL on the contact member 300 so that the gas diffusion portion 422 comes into contact with the lateral surface of the reaction portion 421 of the second GDL.

According to another embodiment of the present disclosure, the gas diffusion portions 422 of the first GDL and the second GDL may be provided on the contact member 300, so that the gas diffusion portions are located to come into contact with the lateral surface of the reaction portion 421 of the second GDL in the first GDE 200 and with the lateral surface of the reaction portion 421 of the second GDL in the second GDE 400. Since the first GDE 200 and the second GDE 400 according to another embodiment of the present disclosure are provided on the central portion A of the first surface of the electrolyte membrane 100 and on the central portion A of the second surface thereof while pressing is performed with 0.5 to 5 MPa, the reaction portion 221 of the first GDL in the first GDE 200 and the reaction portion 421 of the second GDL in the second GDE 400 may be thin due to the pressing. Accordingly, the gas diffusion portion 222 of the provided first GDL may be provided so as to have the same thickness as the reaction portion 221 of the first GDL located in contact with the gas diffusion portion 222, and the gas diffusion portion 422 of the second GDL may be provided so as to have the same thickness as the reaction portion 421 of the second GDL located in contact with the gas diffusion portion 422. Therefore, referring to FIG. 5, the gas diffusion portion 222 of the first GDL and the gas diffusion portion 422 of the second GDL according to another embodiment of the present disclosure may be provided while pressing is performed with 0.5 to 5 MPa. Further, instead of providing the gas diffusion portion 222 of the first GDL and the gas diffusion portion 422 of the second GDL with pressing, the gas diffusion portion 222 of the first GDL may be provided so as to have the same thickness as the reaction portion 221 of the first GDL, and the gas diffusion portion 422 of the second GDL may be provided so as to have the same thickness as the reaction portion 421 of the second GDL. Accordingly, the thickness of the reaction portion 221 of the first GDL included in the first GDE 200 and the thickness of the gas diffusion portion 222 of the first GDL may be adjusted so as to be the same as each other, and the thickness of the reaction portion 421 of the second GDL included in the second GDE 400 and the thickness of the gas diffusion portion 422 of the second GDL may be adjusted so as to be the same as each other. The reaction portion 221 of the first GDL, the reaction portion 421 of the second GDL, the gas diffusion portion 222 of the first GDL, and the gas diffusion portion of the second GDL may be individually provided, so there may be a slight difference in thickness therebetween. However, since the first GDL and the second GDL have a relatively high roughness, a slight difference in thickness hardly causes new spaces. Even when the new spaces are formed, the spaces may act as natural cracks of the first GDL and the second GDL, thus being used as water discharge paths, so the spaces may not adversely affect the performance or mechanical strength of the EGA. That is, in the method of manufacturing the EGA according to the present disclosure, despite the constitution of the stepped portion formed by the provision of the contact member 300, the gas diffusion portion 222 of the first GDL and the gas diffusion portion 422 of the second GDL are provided on the contact member 300 after the first GDE 200 and the second GDE 400 are provided, whereby the limitation that the GDE process cannot be applied to a structure having a stepped portion is overcome. Even when the GDE process is applied, it is possible to reduce the contact resistance between the electrolyte membrane 100 and the electrode by minimizing the limit of the bonding pressure. Further, the gas diffusion layer (GDL) is not damaged, a warpage phenomenon does not occur, and the contact area of the interface having no empty space between the electrode of the GDE and the electrolyte membrane is increased, which makes the surface pressure of the GDL in the GDE uniform and enables gas to flow into each cell at a uniform flow rate.

The gas diffusion portion 222 of the first GDL may be provided on the contact member 300 and the gas diffusion portion 422 of the second GDL may be provided on the contact member 300, so that the gas diffusion portion 222 is located to come into contact with the lateral surface of the reaction portion 421 of the second GDL in the first GDE 200 and so that the gas diffusion portion 422 is located to come into contact with the lateral surface of the reaction portion 421 of the second GDL in the second GDE 400. The gas diffusion portion 222 of the first GDL may be of the same type as or the different type from the reaction portion 221 of the first GDL in the first GDE 200, and the gas diffusion portion 422 of the second GDL may be of the same type as or the different type from the reaction portion 421 of the second GDL in the second GDE 400. When the types of the gas diffusion portion 222 of the first GDL and the reaction portion 221 of the first GDL in the first GDE 200 are different from each other, the reaction portion 221 of the first GDL may have less roughness or fewer pores than the gas diffusion portion 222 of the first GDL. When the types of the gas diffusion portion 422 of the second GDL and the reaction portion 421 of the second GDL in the GDE are different from each other, the reaction portion 421 of the second GDL may have less roughness or fewer pores than the gas diffusion portion 422 of the second GDL. That is, since the reaction portion 221 of the first GDL which has less roughness or fewer pores than the gas diffusion portion 222 of the first GDL is used and since the reaction portion 421 of the second GDL which has less roughness or fewer pores than the gas diffusion portion 422 of the second GDL is used, there is a merit in that the GDE process is easily performed because the reaction portion 221 of the first GDL included in the first GDE 200 is easily coated with the first electrode 210 and because the reaction portion 421 of the second GDL included in the second GDE 400 is easily coated with the second electrode 410.

Therefore, the method of manufacturing the EGA according to another embodiment of the present disclosure has merits in that, even in the case of contact members 300 having a stepped portion structure, that is, in the form of separate sub-gaskets or adhesive sheets, a gas diffusion electrode (GDE) process is applicable thereto and the limitation of using the GDE process only on one surface is overcome. Accordingly, even when the GDE process is applied, it is possible to improve the performance of the EGA manufactured by minimizing the limit of the bonding pressure so as to reduce the contact resistance between an electrolyte membrane 100 and an electrode, and it is also possible to improve the durability of the EGA by minimizing the exposed portion of the electrolyte membrane 100. Therefore, the method of manufacturing the electricity-generating assembly (EGA) according to the present disclosure has merits in that a gas diffusion layer (GDL) is not damaged and a warpage phenomenon does not occur even in a structure having a stepped portion, and that the contact area of the interface having no empty space between the electrode of the GDE and the electrolyte membrane is increased, which makes the surface pressure of the GDL in the GDE uniform and enables gas to flow into each cell at a uniform flow rate.

What is claimed is:

1. A method of manufacturing an electricity-generating assembly (EGA), which comprises an electrolyte membrane, a first electrode disposed on a first surface of the electrolyte membrane, a first gas diffusion layer (GDL) disposed on the first electrode, a second electrode disposed on a second surface of the electrolyte membrane, and a second GDL disposed on the second electrode, the method comprising:
   preparing the electrolyte membrane including a central portion and a peripheral portion laterally extending from the central portion;
   providing a contact member to the peripheral portion of the electrolyte membrane;
   providing at least one of a first gas diffusion electrode (GDE) including a reaction portion of the first GDL and a first electrode layer or a second GDE including a reaction portion of the second GDL and a second electrode layer, on at least one central portion of the first surface of the electrolyte membrane or the second surface of the electrolyte membrane so that one of the first GDL and the second GDL comes into contact with a lateral surface of the contact member; and
   providing a gas diffusion portion of a respective GDL among the first and second GDLs on the contact member so that the gas diffusion portion comes into contact with a lateral surface of the reaction portion of the respective GDL.

2. The method of claim 1, wherein the preparing the electrolyte membrane includes providing the first electrode to the central portion of the first surface of the electrolyte membrane,
   the providing the at least one of the first GDE includes providing the second GDE, including the second electrode and the reaction portion of the second GDL, on the central portion of the second surface of the electrolyte membrane, and
   the providing the gas diffusion portion includes:
      providing the gas diffusion portion of the second GDL on the contact member so that the gas diffusion portion comes into contact with the lateral surface of the reaction portion of the second GDL; and
      providing the first GDL on the first electrode.

3. The method of claim 2, wherein the contact member is disposed to the peripheral portion of the second surface of the electrolyte membrane, or is disposed on both the peripheral portion of the second surface of the electrolyte membrane and the peripheral portion of the first surface of the electrolyte membrane in contact with a lateral surface of the first electrode.

4. The method of claim 2, wherein the contact member includes one or more selected from the group consisting of a sub-gasket and an adhesive sheet.

5. The method of claim 2, wherein the providing the second GDE includes providing the second GDE by pressing with 0.5 to 5 MPa.

6. The method of claim 2, wherein the providing the gas diffusion portion of the second GDL includes providing the gas diffusion portion of the second GDL by pressing with 0.5 to 5 MPa.

7. The method of claim 5, wherein the gas diffusion portion of the second GDL has a thickness equal to a thickness of a reaction portion of the second GDL after the pressing.

8. The method of claim 2, wherein the reaction portion of the second GDL has less roughness or fewer pores than the gas diffusion portion of the second GDL.

9. The method of claim 2, wherein the first GDL has a thickness smaller than or equal to a thickness of the second GDL.

10. The method of claim 2, wherein the first GDL includes pores fewer than or equal to pores in the second GDL.

11. The method of claim 1, comprising:
preparing the electrolyte membrane including the central portion and the peripheral portion laterally extending from the central portion;
providing the contact member to the peripheral portion of the electrolyte membrane;
providing the first GDE, including the reaction portion of the first GDL and the first electrode layer, on the central portion of the first surface of the electrolyte membrane so that the first GDE comes into contact with the lateral surface of the contact member, and providing the second GDE, including the reaction portion of the second GDL and the second electrode layer, on the central portion of the second surface of the electrolyte membrane so that the second GDE comes into contact with the lateral surface of the contact member; and
providing the gas diffusion portion of the first GDL on the contact member so that the gas diffusion portion comes into contact with the lateral surface of the reaction portion of the first GDL, and providing the gas diffusion portion of the second GDL on the contact member so that the gas diffusion portion comes into contact with the lateral surface of the reaction portion of the second GDL.

12. The method of claim 11, wherein the contact member is provided to both the peripheral portion of the first surface of the electrolyte membrane and the peripheral portion of the second surface of the electrolyte membrane.

13. The method of claim 11, wherein the contact member includes one or more selected from the group consisting of a sub-gasket and an adhesive sheet.

14. The method of claim 11, wherein the providing the first GDE and the second GDE includes providing the first GDE and the second GDE by pressing with 0.5 to 5 MPa.

15. The method of claim 11, wherein the providing the gas diffusion portion includes providing the gas diffusion portion of the first GDL and the gas diffusion portion of the second GDL by pressing with 0.5 to 5 MPa.

16. The method of claim 14, wherein the gas diffusion portion of the first GDL has a thickness equal to a thickness of the reaction portion of the first GDL after the pressing and so that the gas diffusion portion of the second GDL has a thickness equal to a thickness of the reaction portion of the second GDL after the providing the first GDE and the second GDE by pressing.

17. The method of claim 11, wherein the reaction portion of the first GDL has less roughness and fewer pores than the gas diffusion portion of the first GDL, and the reaction portion of the second GDL has less roughness and fewer pores than the gas diffusion portion of the second GDL.

18. The method of claim 11, wherein the first GDL has a thickness smaller than or equal to a thickness of the second GDL.

19. The method of claim 11, wherein the first GDL includes a number of pores fewer than or equal to a number of pores in the second GDL.

* * * * *